United States Patent [19]

Spock et al.

[11] Patent Number: 4,641,517
[45] Date of Patent: Feb. 10, 1987

[54] CONTROL SYSTEM ACTUATOR POSITION SYNTHESIS FOR FAILURE DETECTION

[75] Inventors: Wayne R. Spock, Canton; Peter J. Urbanik, Wethersfield, both of Conn.

[73] Assignee: United Technologies Corporation, Hartford, Conn.

[21] Appl. No.: 683,887

[22] Filed: Dec. 20, 1984

[51] Int. Cl.$^4$ ............................................. G01M 15/00
[52] U.S. Cl. ........................................ 73/116; 364/551
[58] Field of Search ................ 73/117.3, 432 SD, 116; 364/551

[56] References Cited

U.S. PATENT DOCUMENTS

| 3,731,070 | 5/1973 | Urban | 364/551 |
| 4,158,884 | 6/1979 | McKinley et al. | 73/117.3 |
| 4,402,217 | 9/1983 | Higashiyama | 73/117.3 |

Primary Examiner—Stewart J. Levy
Assistant Examiner—Robert R. Raevis
Attorney, Agent, or Firm—Dominic J. Chiantera

[57] ABSTRACT

Redundant sensed position feedback signal samples of an actuator which are provided in each sample period, a synthesized feedback position signal value provided from an actuator algorithm model. The sensed samples are rejected for use in the sample period if the difference magnitude between the sample value and the synthesized value exceeds an accepted magnitude. The number of sample periods in which a sample is rejected is recorded, and if the number is sufficiently high the sensed feedback signal is rejected from further use and the associated position sensor is recorded as failed. If both sensed samples are rejected in the same period a diagnostic routine determines if the fault is in the sensors or the actuator.

3 Claims, 8 Drawing Figures

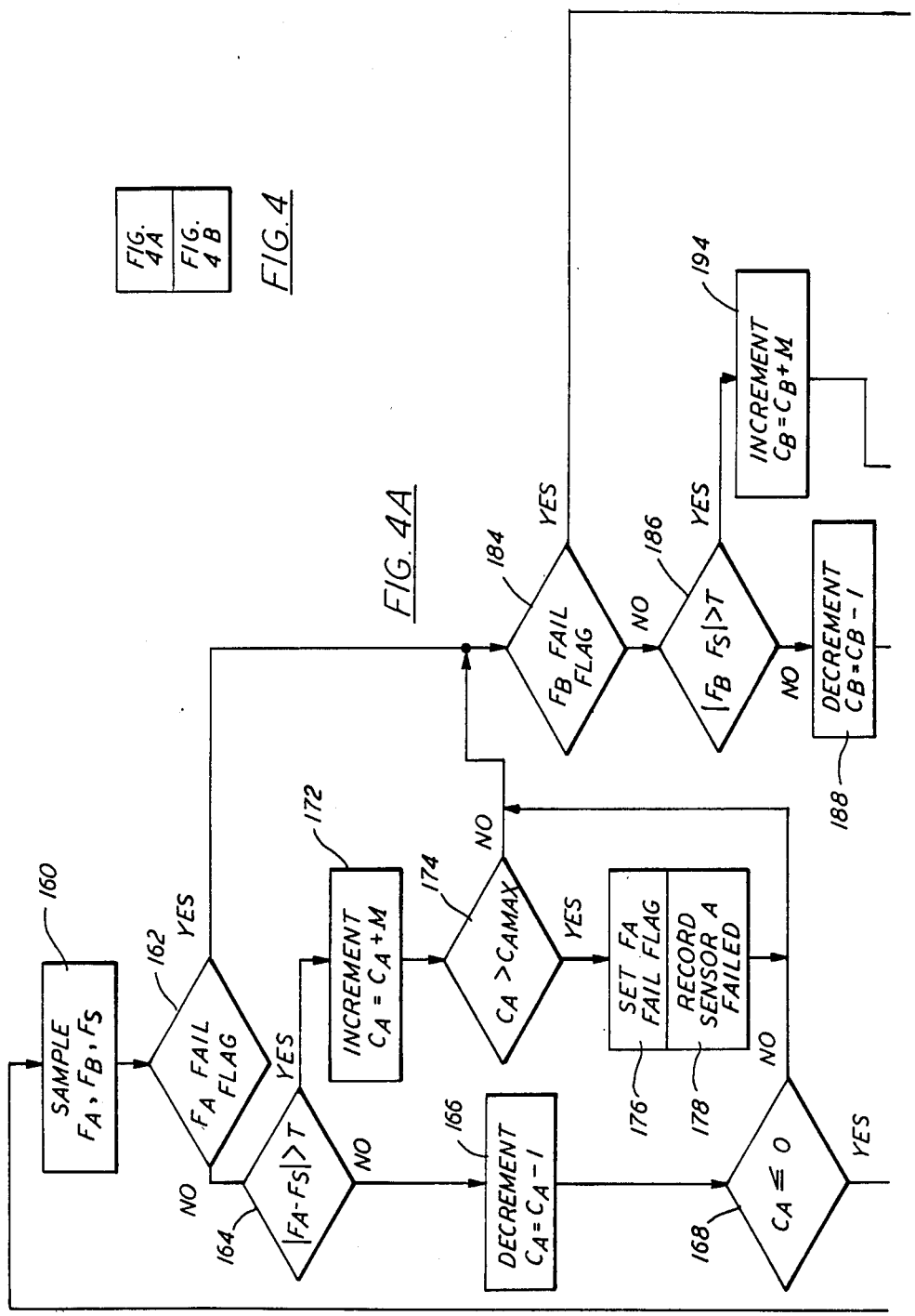

CONTROL SYSTEM ACTUATOR POSITION SYNTHESIS FOR FAILURE DETECTION

DESCRIPTION

TECHNICAL FIELD

This invention relates to electronic engine controls (EECs) for gas turbine engines, and more particularly to failure detection circuitry for use therein.

BACKGROUND ART

As known, EECs electronically control operation of gas turbine engines based on selected control algorithms executed by the EEC. The EEC applies the control algorithms in response to sensed engine parameter signals to provide electrical control signals to engine mounted electro-mechanical devices. These include linear and rotary position actuators which position various engine valves, vanes, etc. to regulate engine performance.

To ensure reliability, the EEC includes redundant control circuitry, i.e. primary and secondary control channels. The sensed engine parameter signals are also redundant, and are applied to each of the EEC channels. The sensed parameter signals include analog (amplitude and frequency) signal formats, as well as digital.

Digital electronic engine controls (DEEC) use digital signal processing to apply the control algorithms to the sensed parameter signals. For the analog sensed signal formats this requires analog-to-digital (A/D) conversion, all of which is well known. Since A/D conversion is sensitive to spurious noise associated with the analog signal it is also known to provide the DEEC with input selection logic. This logic selects the best signal from among the two actual sensed parameter signals.

The executed control law algorithms provide the output control signals, including actuator position command signals to the engine mounted actuators, which physically position the various valves and vanes in the engine. Since reliability of the actuator loops is critical to engine reliability, the redundant position feedback signals from the actuator are compared to detect gross malfunction. As a result, the DEEC can detect a faulty actuator control loop and use a backup actuator system (if available). The difficulty, however, is the ability to isolate the particular failed component in the actuator operating system, and then to identify the failed component to maintenance personnel.

DISCLOSURE OF INVENTION

The object of the present invention is to provide fault detection and fault reporting routines for use in DEEC systems.

According to the present invention, the redundant sensed actuator position signals are sampled periodically and the samples compared to a synthesized position value obtained from an actuator model, if the difference magnitude between the sample value and the synthesized value exceeds an accepted magnitude the sample is rejected for use in the sample period and the periodicity of sample rejection is recorded, if the periodicity becomes sufficiently high the sensed feedback signal itself is rejected for use in the actuator control loop and the signal's position sensor is recorded as failed, if both samples are simultaneously rejected in the same sample period a diagnostic routine determines if the fault is in the sensors or the common actuator, and the actuator is deactivated.

These and other objects, features, and advantages of the present invention will become more apparent in light of the following detailed description of a best mode embodiment thereof, as illustrated in the accompanying Drawing.

BRIEF DESCRIPTION OF DRAWING(S)

FIGS. 2, 2A and 2B are system block diagrams of the failure detection circuitry of the present invention;

FIGS. 4, 4A and 4B are flowchart diagrams illustrating the steps performed by the circuitry of FIG. 2.

BEST MODE FOR CARRYING OUT THE INVENTION

Figure 1:
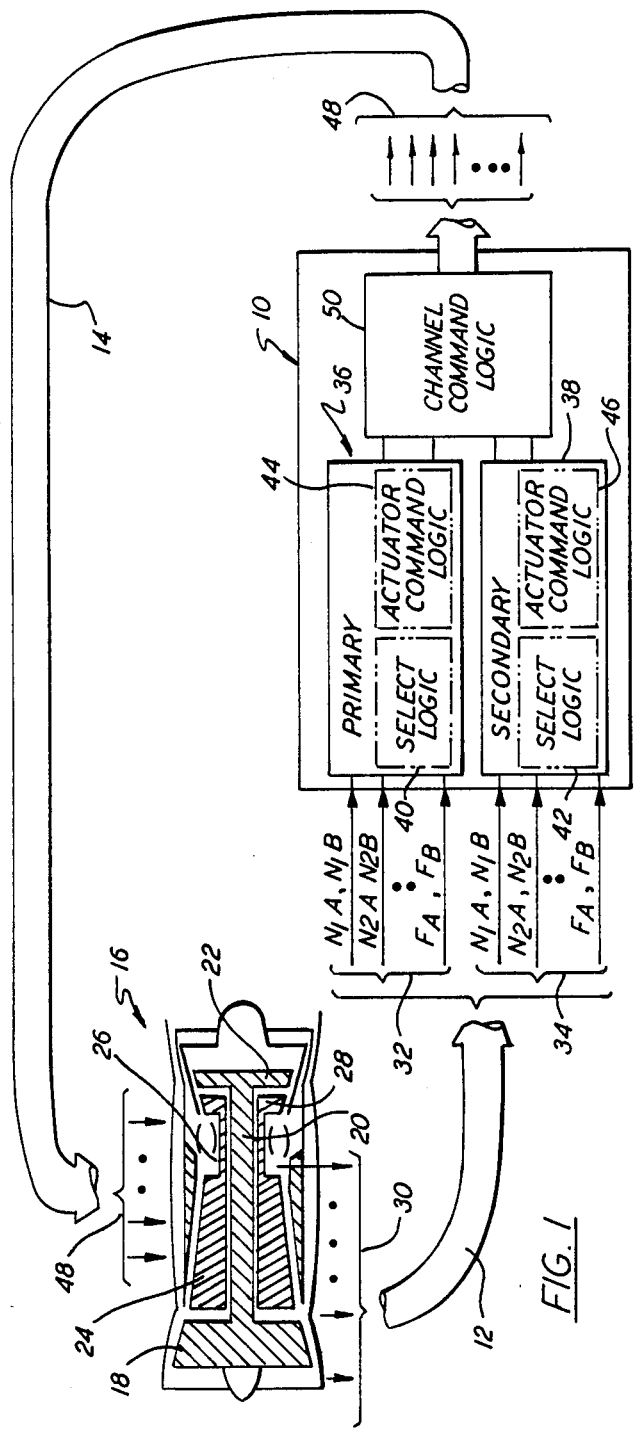
FIG. 1 is a conceptual illustration of an electronic engine control, which is used in the description of the present invention.

FIG. 1 is a simplified, conceptual block diagram of a digital electronic engine control (DEEC) 10 in which the present invention may be used. The DEEC is connected through sensor lines 12 and control lines 14 to a gas turbine engine 16. The engine shown is a twin spool turbofan engine with a low compressor 18 driven through shaft 20 by a low turbine 22, and a high compressor 24 driven through shaft 26 by a high turbine 28. The present invention, however, may be used with any configuration gas turbine engine.

The sensed engine parameters 30 include two identical, i.e. redundant, sensed parameter signals for selected engine operating parameters. These include: redundant low turbine sensed speed signals $N_{1A}$, $N_{1B}$, redundant high turbine sensed speed signals N2A, N2B, and redundant sensed position feedback voltage signals $F_A$, $F_B$ from each position controlled device in the engine. The redundant sensed speed and sensed position feedback signals are presented through lines 12 to the inputs 32, 34 of both a primary control channel 36 and secondary control channel 38 of the DEEC.

In the conceptual illustration of FIG. 1, each DEEC channel is shown to include signal selection logic 40, 42, and actuator command logic 44, 46. The selection logic selects the best available sensed parameter signal (e.g. best of redundant sensed position feedback) for presentation to the actuator command logic. The actuator command logic uses the selected sensed parameter signal to provide the output actuator position control signals 48 on lines 14 from the primary channel or secondary channel, as determined by channel command logic 50.

Figure 2B:
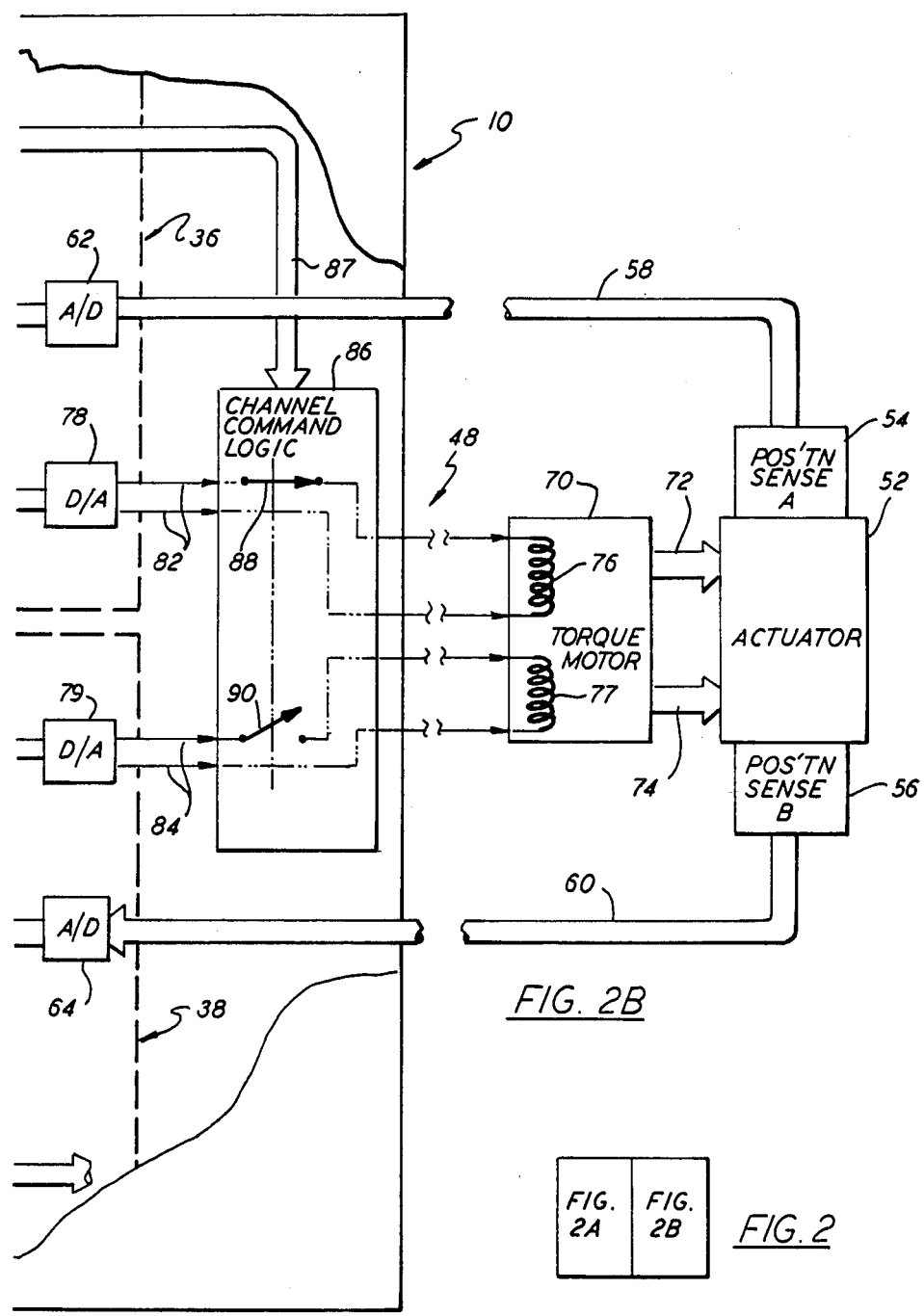
Figure 2A:
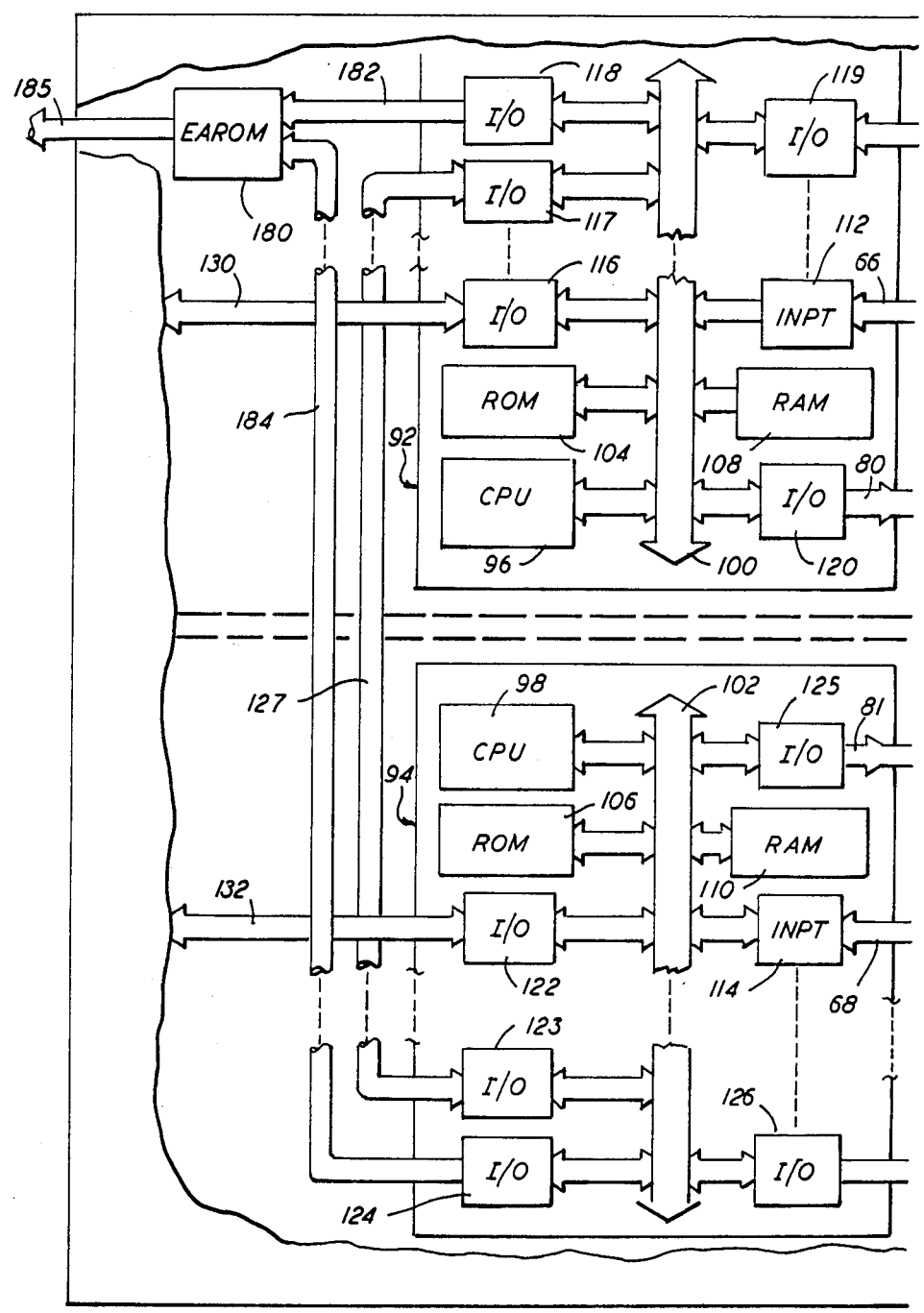

FIG. 2 is a detailed block diagram of the relevant circuitry of the primary and secondary channels 36, 38, in which the present failure detection circuitry may be used. In the present embodiment the present failure detection scheme is shown for use with one of the engine's position actuators (e.g. 52), and its redundant actuator position sensors 54, 56. In FIG. 2 the redundant sensors are labeled position sensor A and position sensor B. The use of redundant position sensors and redundant drive coils (described hereinafter) is required within the hostile engine environment to ensure single fault tolerance of the DEEC.

The position sensors A, B (54, 56) provide sensed position feedback signals ($F_A$, $F_B$ respectively) on lines 58, 60 to the analog-to-digital (A/D) converters 62, 64 within the DEEC 10, to convert the amplitude intelligence of the sensed analog signals to equivalent digital signals. The digital signal bits are provided on lines 66, 68 to the primary and secondary channels 36, 38.

The actuator 52 may be either a linear or rotary type actuator. In the FIG. 2 embodiment it is a linear, pneumatic actuator driven by torque motor 70 which provides fluid through lines 72, 74 to upper and lower chambers of the actuator to extend or retract the actuator position. The torque motor includes redundant current drive windings 76, 77 each driven by separate analog drive current signals provided on the DEEC output lines 48 from the channel command logic 86. The drive current signals are provided by digital-to-analog (D/A) converters 78, 79 in the primary and secondary channels. Each D/A converter receives the equivalent digital actuator drive signals through lines 80, 81 from the associated primary and secondary channel.

Although identical primary and secondary channels are used to provide redundant control, only one channel is in control at any one time. Therefore, only one of the torque motor coils 76, 77 is energized at any one time. The channel command logic 86 connects the D/A output on one set of lines 82, 84 to the DEEC output lines 48 in response to command signals received on lines 87 from the primary channel. To facilitate understanding, the channel command function is illustrated by a pair of single pole—double throw switches 88, 90; one connected to each channel's actuator current signal output on lines 82, 84.

In FIG. 2, only those portions of the primary and secondary channels as are necessary to the present invention, are shown. Each channel includes its own signal processor; signal processor 92 for the primary channel and 94 for the secondary channel. Each signal processor includes a central processing unit (CPU) 96, 98, which are typically sixteen bit machines of a type known in the art, connected through buses 100, 102 to read only memory (ROM) 104, 106 and random access memory (RAM) 108, 110. The ROM and RAM memories are of a known type, with memory capacity determined by the particular DEEC control application. The ROM stores the CPU program memory, including the DEEC control algorithms and the present failure detection algorithm. The RAM provides data storage. Each of the signal processors 92, 94 include input interfaces 112, 114 for receiving the sensed position feedback signals $F_A$, $F_B$ on the lines 66, 68, and input/output (I/O) interfaces 116–120 and 122–126. The two CPUs exchange the sensed feedback signal information through lines 127 connected to I/O interfaces 117, 123.

The operation of the DEEC in controlling the position of actuator 52, is well known. Briefly, control information relating to the desired position of the actuator is received by the primary and secondary channels. The DEEC selection circuitry and preceding control law functions (not shown) provide actuator position command signals on the input lines 130, 132 to the primary and secondary signal processors 92, 94. The position command signals are received by each of the processor CPUs 96, 98 through I/O interfaces 116, 122 and the processor buses 100, 102. The CPUs, in response, provide the actuator drive current signals through I/O interfaces 120, 125 and lines 80, 81 to the D/A converters 78, 79.

The torque motor responds to the drive current signals on the energized winding to slew the actuator (displacement per unit time, i.e. velocity). The position sensors A, B (54, 56) both track the actual position; each providing the respective feedback signals $F_A$, $F_B$ on the lines 58, 60.

Figure 3:
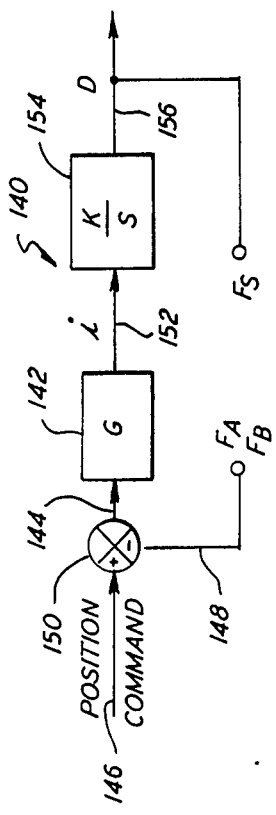
FIG. 3 is a functional diagram of an actuator model response, for use in describing operation of the circuitry of FIG. 2.

The present invention selects the one of the two sensed position feedback signals ($F_A$, $F_B$) which is used in the actuator control algorithm executed by the CPUs 96, 98. The selection is based on a CPU routine which compares the magnitude of each of the sensed position feedback signals with the magnitude of a synthesized feedback signal ($F_S$), which represents the position response of an idealized "model" of the actuator loop. FIG. 3 illustrates the synthesizing of the position feedback signal in model 140 which includes the forward gain (G) 142 of the actuator loop. An error signal on line 144 is equal to the difference signal magnitude between the actuator position command signal on line 146 and the selected one of the sensed feedback signals ($F_A$, $F_B$) on lines 148, as provided by summing junction 150. The product of the error signal and the forward gain produces an actuator current signal on line 152 to the actuator model 154, illustrated as the LaPlace integral transform K/S. The resulting integral, which represents actuator position, is provided on output line 156 as the synthesized feedback signal ($F_S$).

Figure 4B:
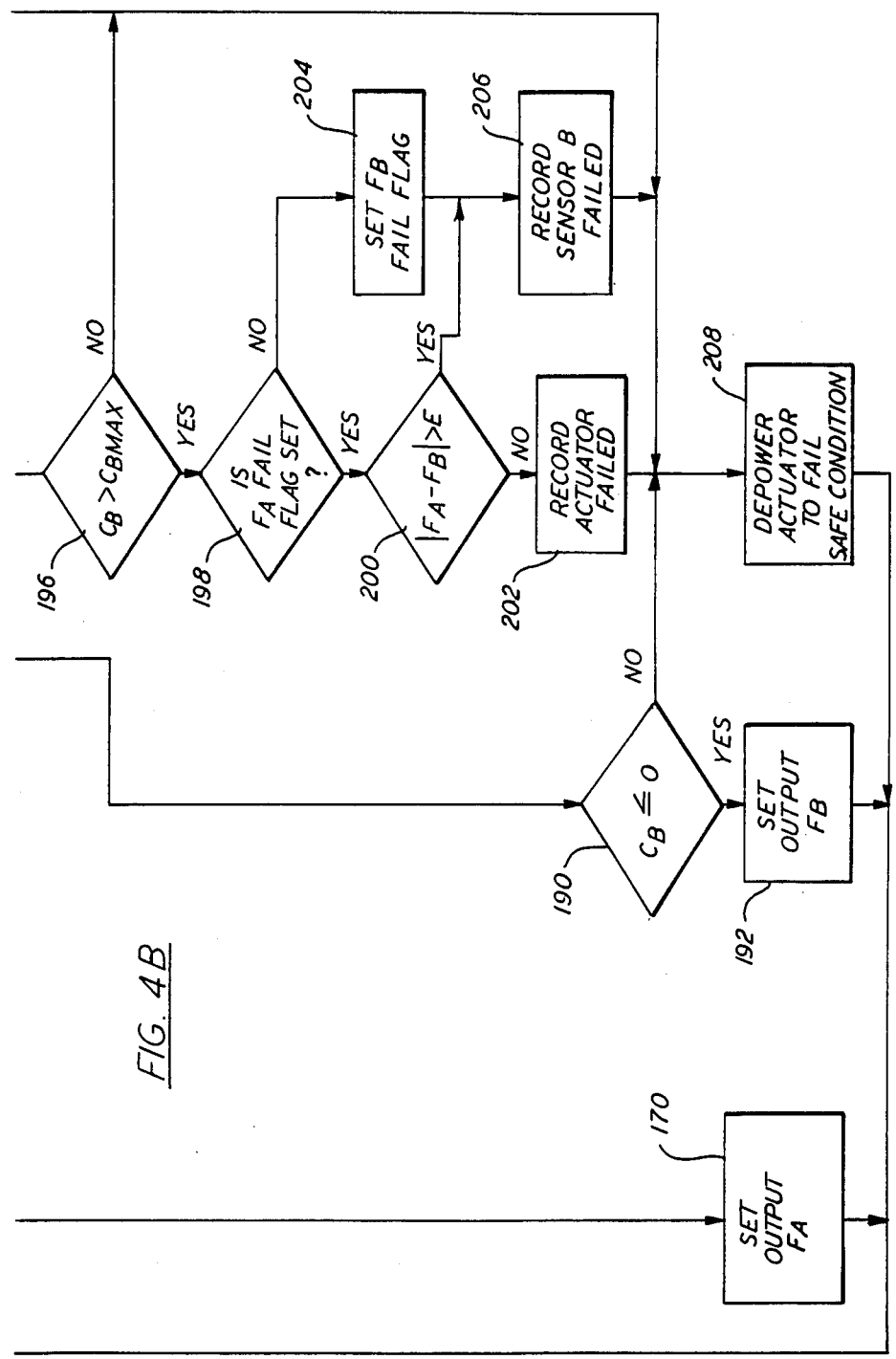

FIG. 4 is the flowchart of the source code listing for performing the fault isolation algorithm of the present invention in the DEEC control channel signal processors (92, 94). In operation, instructions 160 request the sampling of the two actual feedback sample values $F_A$, $F_B$, and the synthesized value $F_S$. Decision 162 determines if the $F_A$ FAIL FLAG is set. This flag is set in response to the permanent rejection of the $F_A$ sensed signal, precipitated by either a "hard" failure (i.e. mechanical or electrical malfunction) or a "soft" failure (i.e. out of tolerance), all of which is described hereinafter.

Assuming no present rejection of the $F_A$ sensed signal, decision 162 results in a NO answer. Decision 164 next determines if the absolute value of the difference signal magnitude between the sensed signal $F_A$ and the synthesized signal $F_S$ is greater than a selected tolerance (T). If NO, instructions 166 decrement a counter ($C_A$) by one count. As described hereinafter, the invention counts each YES (an "out of tolerance" occurrence) as a multiple count; typically three. Each NO (in tolerance) occurrence results in the single down count. It requires three nonrejected samples to cancel each rejected sample occurrence. A positive sum count indicates a failure mode condition.

Following instructions 166 decision 168 determines if the present sum count is less than, or equal to zero (indicating no immediately preceding rejected samples). If YES (no evidence of sample malfunctions), instructions 170 select the $F_A$ sensed signal sample as the actual feedback position of the actuator for the present sample interval. Instructions 170 set the output to $F_A$, after which the routine branches back to instructions 160.

If $F_A$ is out of tolerance, instructions 172 increment the count $C_A$ by a multiple count value M. As stated, the multiple count value is typically three. Decision 174 next determines if the count $C_A$ is greater than a maximum count value $C_{A\ MAX}$. If YES, indicating a high frequency of failure occurrences, instructions 176 set the $F_A$ FAIL FLAG; permanently rejecting use of the $F_A$ sensed signals for the remainder of the flight. Instructions 178 record the message "sensor A failed" in the RAM of the controlling one of the two channels (RAM 108, 110). Alternatively, the message may be recorded in nonvolatile memory. Preferably an electrically alterable read only memory (EAROM) 180 (FIG. 2) which can be written to directly by each of the two DEEC channel I/O interfaces 118, 124, through lines 182, 184. The EAROM content can be read through lines 185 on the ground. This provides a failure history log which is accessible by maintenance personnel.

Referring again to FIG. 4, following processing of the $F_A$ sample, decision 184 determines if the $F_B$ FAIL FLAG is set. The $F_B$ condition is not examined until the $F_A$ sensed signal sample is rejected. If NO, decision 186 determines if the difference signal magnitude between the $F_B$ sample value and the $F_S$ value is greater than the selected tolerance (T). If NO, instructions 188 decrement the sum count $C_B$ by one. Decision 190 determines if $C_B$ is less than or equal to zero. If YES, instructions 192 select the $F_B$ sensed value for the present sample cycle.

If the $F_B$ sample is out of tolerance, a YES to decision 186 is followed by instructions 194 which increment the $C_B$ sum count by the multiple count value M (typically three). Decision 196 next determines if the count $C_B$ is greater than the maximum. If YES, decision 198 determines if the $F_A$ FAIL FLAG is set. This decision is diagnostic. If the $F_A$ FAIL FLAG is already set and the $F_B$ sensed sample value is now rejected, there may be a common cause to both failures; the actuator itself may be at fault. Therefore, in response to a YES to decision 198, decision 200 determines if the difference signal magnitude between the $F_A$ and $F_B$ samples is greater than a selected error (E) amount. If NO, this indicates that the sensor outputs are tracking within a relative tolerance band; each, however, are out of tolerance with respect to the synthesized $F_S$ value. It is assumed in response to a NO from decision 200, that the fault does not lie in the sensors but instead in the actuator itself. As a result, instructions 202 record an "actuator failed" message in memory, i.e. in EAROM 180.

If the answer to decision 198 is NO, meaning that there is no apparent trend to sensor failures, instructions 204 set the $F_B$ FAIL FLAG, indicating permanent rejection of the $F_B$ sensed signal. Following instructions 204, or a YES to decision 200 (the two sensors are not tracking within an acceptable E error band) instructions 206 record a "sensor B failed" message in memory 180 (FIG. 2).

Following instructions 202, 206, or a YES to decision 184, instructions 208 request that the actuator be depowered to a predetermined, safe condition. This is necessary since neither of the two sensed position values were found to be acceptable, or the actuator itself was determined to be at fault.

Although the invention has been shown and described with respect to a best mode embodiment thereof, it should be understood by those skilled in the art that various other changes, omissions, and additions in the form and detail thereof may be made therein without departing from the spirit and scope of the invention.

We claim:

1. Apparatus for diagnosing failures in an actuator loop of a digital electronic engine control (DEEC) which controls the actuator position in each of a plurality of successive sample intervals in dependence on the difference signal magnitude between an actuator position command signal sample and an actual actuator position signal sample selected from one of two sensed actuator position signals provided from first and second position sensors associated with the actuator, comprising:

model means, for simulating the signal response of the actuator loop to the difference signal magnitude between the actuator position command signal sample and the selected actual position signal sample from a preceding sample interval, to provide a synthesized actuator position signal sample representative of the expected actuator position in a present sample interval;

signal selection means, responsive to the actual position signal samples of each sensed actuator position signal and responsive to said synthesized signal sample, for determining the difference signal magnitude between each actual position sample and said synthesized sample to select for use by the DEEC, a first one of the actual samples whose difference value is within a maximum position difference limit, for rejecting for use in a sample interval an actual sample having a difference signal value greater than said maximum position limit, for providing a fail signal identifying as failed any of said position sensors providing an actual signal sample having a difference magnitude greater than said maximum limit in a successive number of sample intervals; and recording means, for recording each of said fail signals from said selection means to provide a failure diagnosis record for the actuator loop.

2. The apparatus of claim 1, wherein said signal selection means, in response to both of said actual samples having a difference magnitude greater than said maximum position limit, for providing an actuator loop failure signal to the DEEC to command actuator shutdown, for determining the difference signal magnitude between said actual samples, and in response to an actual sample difference signal magnitude less than an error difference limit, for providing a failure signal identifying the actuator as failed.

3. The apparatus of claim 1, further comprising:

counter means, responsive to each of said actual sample rejections by said selection means, for counting each sample interval rejection as a plural count value and each sample interval nonrejection of a particular actual sample as a single count value, said counter means subtracting said single count nonrejections from said plural count rejections to provide a sum count signal indicative of the accrued rejections and non-rejections in each present sample interval, and detection means, responsive to said sum count signal, for providing a maximum sum count signal in response to said sum count value exceeding a maximum selected count value, and wherein said selection means is responsive to said maximum sum count signal for providing said fail signal in the presence thereof.

* * * * *